United States Patent Office 2,826,994
Patented Mar. 18, 1958

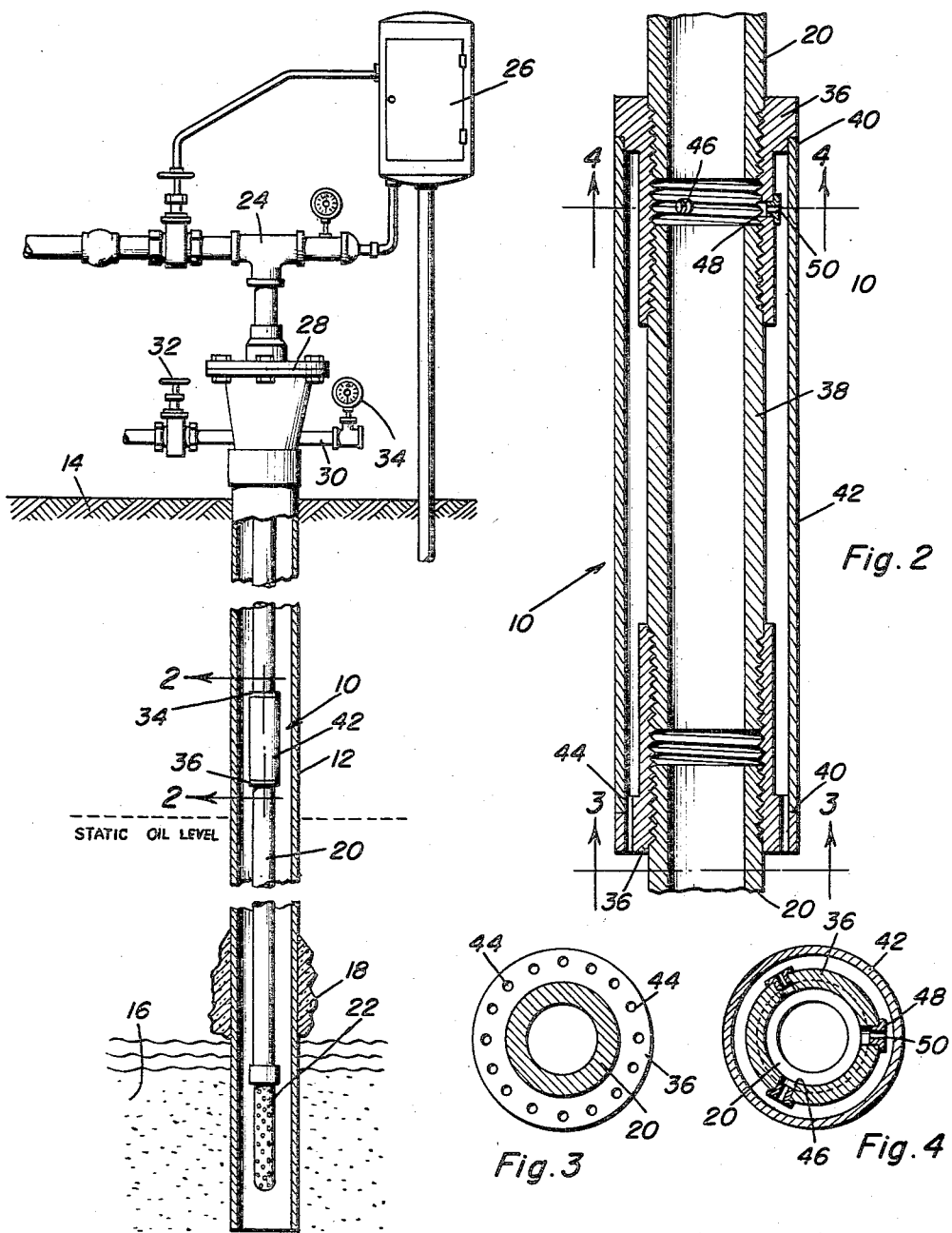

2,826,994

SUPERCHARGER FOR OIL LIFT SYSTEM

Benjamin V. Slater, Wickett, Tex.

Application August 4, 1955, Serial No. 526,469

2 Claims. (Cl. 103—232)

This invention generally relates to an improved and novel apparatus for use in flowing oil from an oil well when the natural pressure has fallen to a relatively low degree so that the flow periods of the oil are at infrequent intervals.

An object of the present invention is to provide a device which acts substantially as a supercharger to be installed into the flow line at any given point and which is lowered into the well to a position above the static level of oil wherein air or gas pressure either from a natural or manufactured source may be introduced into the oil wherein the oil will become lighter in density for reducing the load in the flow lines to any given amount as desired to facilitate and increase the flow of oil from the flow line due to the reduction in specific gravity.

Another object of the present invention is to provide a supercharger for installation in an oil flow line for assisting the oil flow by mixing pressurized gaseous fluids with the liquid oil for reducing the weight per unit volume of the oil flow, thereby assisting such flow.

Other objects of the present invention will reside in its simplicity of construction, ease of installation, ease of adaptation for various types of oil wells, efficiency of operation and its relatively inexpensive manufacturing costs.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1 is a schematic view of an oil well having the supercharger of the present invention installed in the flow line therein;

Figure 2 is a longitudinal, vertical sectional view taken substantially upon a plane passing along section line 2—2 of Figure 1 illustrating the specific structural details of the present invention;

Figure 3 is a transverse, sectional view taken substantially upon a plane passing along section line 3—3 of Figure 2 illustrating the bottom construction of the present invention illustrating the inlet openings for the pressurized gaseous fluid; and Figure 4 is a transverse, vertical sectional view taken substantially upon the plane passing along section line 4—4 of Figure 2 illustrating the construction and spacing of the inlet orifices extending into the oil flow line.

Referring now to the accompanying drawings, the numeral 10 generally designates the supercharging device of the present invention. The supercharging device 10 is adapted for use in an oil well casing 12 inserted below the ground level 14 and terminating in the oil sand 16, and may be cemented, as indicated by the numeral 18, in any suitable manner. An oil flow line 20 is disposed concentrically in spaced relation within the well casing 12 and terminates at its lower end in a screened or perforated inlet 22 which is disposed within the oil sand 16 for receiving the oil flow upwardly. Connected to the upper end of the oil tube or flow line 20 is a key pipe 24 which leads to various control mechanisms 26. The upper end of the casing 12 is closed by a tubing head 28 to which is connected a pipe 30 with a control valve 32 thereon together with a pressure gauge 34 for permitting inlet of pressurized gases into the area between the casing 12 and the flow line 20.

The supercharger 10 generally includes a pair of internally threaded collars 36 which are threaded onto adjacent ends of a portion of the flow line 20. Extending between and threadedly engaged with the collars 36 is a connecting pipe 38 which is the same size as the flow line 20 and forms a continuation thereof wherein the ends of the connecting pipe 38 are spaced from the ends of the flow line sections 20. Each of the collars 36 is provided with an annular facing shoulder 40 for receiving an outer cylindrical shell 42 therebetween wherein the shell is seated on the shoulders 40 on the collars 36 and is disposed in spaced concentric relation to the connecting pipe or nipple 38.

The lower collar 36 is provided with a series of vertically extending bores 44 which extend upwardly in between the shell 42 and the nipple 38 for permitting entry of pressurized gases between the shell 42 and the nipple 38.

The upper collar 36 is provided with a plurality of peripherally spaced openings 46 having adapters 48 therein forming orifices 50 wherein the orifices 50 intercommunicate the annular space between the shell 42 and the nipple 38 with the interior of the nipple 38 and the oil flow line 20. It will be noted that the orifices 50 are adjacent the upper end of the nipple 38 and are disposed between the adjacent ends of the nipple 38 and the upper section of the oil flow line 20 wherein pressurized gases will enter the apertures or bores 44 and proceed upwardly between the shell 42 and nipple 38 and enter into the oil flow line through the orifices 50.

As a general rule, the supercharger 10 will get its pressurized gases from the same source as that originally forcing the liquid oil up the flow line. Assuming that this is the case, every oil well will have a capacity of at least ten barrels in the bottom hole area. The supercharger of the present invention constantly equalizes the pressure between the annular space in the casing and that in the flow line and, when the well pressure has built up to a desired amount, a surface valve on said flow line opens, manually or automatically, releasing the pressure in the flow line, thus permitting the oil to advance swiftly through the supercharger which will mix the pressurized gases with the supply of oil as it passes through said supercharger, thereby reducing the specific gravity of the liquid as it proceeds up the flow line, thereby reducing the load in the flow line for facilitating movement of the oil therein. By changing the size of the orifices 50, the reduction of the load may be determined and the flow characteristics adjusted. Normally, orifices ranging from $\frac{1}{16}''$ to $\frac{1}{8}''$ in diameter will suffice. The supercharger 10 is normally positioned approximately 50' above the static level of oil and the vertical distance between the bores 44 and the orifices 50 provides a sediment or settling chamber, thereby eliminating the collection of dirt and other foreign matter within the orifices 50. In the event such clogging of the orifices 50 does occur, they may be cleaned out by reversing the flow of pressure gas thereby running it downwardly through the flow line 20 for removing any clogging materials that may be lodged in the orifices 50. If desired, an intermitter may be utilized above the ground surface for periodically relieving the pressure in the flow line by opening the flow line valve, thereby permitting the supercharger to more expeditiously reduce the weight of oil, thereby reducing the pressure required to force it to the ground surface.

The device may be constructed using any length of flow line 20, and may also be constructed having varying numbers of inlet ports or bores 44 and orifices 50 dependent upon the particular installation requirements. The device is especially useful in old or lazy oil wells wherein the casing may be rusty or other foreign materials tend to clog up the usual jet type lifting devices.

Another feature of this supercharger design is that a smaller size can be made and will work equally as well, and will overcome a serious problem confronting an operator having a well that has old and eroded casing in it. This casing is not safe to hold gas pressure up at the higher level in the well. The tubing, of course, is good and by using a packer affixed to the tubing at a lower level in the well for the purpose of holding all gas down in that lower part of the well, the smaller size supercharger will be installed in a 1" flow line and lowered into the present flow tubing. This is known as flowing through a macaroni flow string.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A supercharging device for installation in a vertical oil flow line disposed in a well casing, the oil flow line having an upper section and a lower section disposed in longitudinal alignment and in spaced relation with the adjacent ends of the upper and lower sections being externally threaded, said device comprising a nipple disposed in alignment with the upper and lower sections of the oil flow line, the ends of said nipple being externally threaded and disposed in longitudinal spaced relation to the threaded ends of the upper and lower sections of the oil flow line, an internally threaded cylindrical upper collar threadedly receiving the upper end of the nipple and the adjacent threaded end of the upper section, an internally threaded cylindrical lower collar threadedly receiving the lower end of the nipple and the adjacent end of the lower section of the oil flow line, said nipple being substantially the same diameter as the oil flow line and forming a continuation thereof, each of said collars having an annular shoulder at the outer end thereof, a cylindrical shell disposed between said shoulders and disposed in concentric spaced relation to the nipple and the inner ends of said collars, the upper collar having a plurality of radial openings disposed inwardly of the annular shoulder and communicating the interior of the oil flow line with the area between the shell and nipple, the shoulder on the lower collar having a plurality of longitudinal bores disposed inwardly of the shell for communicating the area between the shell and nipple with the area between the oil flow line and well casing whereby pressurized gas between the well casing and oil flow line will pass upwardly through the bores and between the shell and nipple and inwardly through the radial openings into the oil flow line for mixture with the oil in the oil flow line for reducing the specific gravity of the oil for facilitating the upward flow thereof.

2. The combination of claim 1 wherein said openings in the upper collar are provided with removable annular adapters for varying the size of the openings and forming orifices for passage of the pressurized gas, said adapters reducing the velocity of the pressurized gas thus permitting any foreign matter to settle to the bottom of the area between the shell and nipple thus preventing clogging of the orifices.

References Cited in the file of this patent

UNITED STATES PATENTS

| | | |
|---|---|---|
| 740,999 | Couse | Oct. 6, 1903 |
| 1,811,381 | Berwick | June 23, 1931 |
| 1,884,459 | Williams | Oct. 25, 1932 |
| 2,002,791 | Otis | May 28, 1935 |